United States Patent [19]

Brule

[11] Patent Number: 4,618,548
[45] Date of Patent: Oct. 21, 1986

[54] ELECTROLYTE ADDITIVE

[75] Inventor: James E. Brule, South Windsor, Conn.

[73] Assignee: Combustion Engineering, Inc., Windsor, Conn.

[21] Appl. No.: 712,978

[22] Filed: Mar. 18, 1985

[51] Int. Cl.⁴ ............................................. H01M 6/14
[52] U.S. Cl. ................................... 429/194; 429/198; 252/62.2
[58] Field of Search ................. 429/199, 198; 252/62.2

[56] References Cited

U.S. PATENT DOCUMENTS

| | | | |
|---|---|---|---|
| 3,166,557 | 1/1965 | Ross et al. | 252/62.2 |
| 4,163,829 | 8/1979 | Kronenburg | 429/194 |
| 4,247,608 | 1/1981 | Watanabe et al. | 429/194 |

FOREIGN PATENT DOCUMENTS 54-01827  1/1979  Japan .................................. 429/194

OTHER PUBLICATIONS

Chemical Abstract, 88:47238, 1978.

Primary Examiner—Brian E. Hearn
Assistant Examiner—Stephen J. Kalafut
Attorney, Agent, or Firm—Brumbaugh, Graves, Donohue & Raymond

[57] ABSTRACT

A nonaqueous electrolyte for a lithium battery containing an ionizable lithium salt as the solute and a dipolar aprotic organic solvent therefore is improved by incorporating into the electrolyte 1,4-diazabicyclo [2.2.2] octane as an energy density enhancing additive in an amount from about 2% by weight to about 8% by weight.

7 Claims, No Drawings

ELECTROLYTE ADDITIVE

SPECIFICATION

The present invention relates to a nonaqueous electrolyte for a lithium battery wherein the electrolyte contains an energy density enhancing additive.

Nonaqueous lithium batteries, particularly nonaqueous lithium secondary batteries, comprise an anode having lithium metal as the anode-active material, a cathode having a metal chalcogenide as the cathode-active material, and a nonaqueous electrolyte containing an ionizable lithium salt as the solute and a dipolar aprotic organic solvent therefor.

Metal chalcogenides useable as the cathode-active material in such batteries typically include the di-, tri- and mixed chalcogenides (e.g., oxides, sulfides, selenides, tellurides) of the transition metals of Groups 1B to 7B and 8 of the Periodic Table of Elements (e.g., titanium, vanadium, tantalum, chromium, iron, cobalt, nickel, manganese, niobium, ruthenium, molybdenum, hafnium, zirconium and tungsten). These materials can further contain carbon, phosphorus or a halide (bromine, chlorine, iodine). Representative examples thereof include $TiS_2$, $TiS_3$, $VS_2$, $CrS_2$, $FeS$, $FeS_2$, $ZrS_2$, $NbS_2$, $WS_2$, $CrS_4$, $NbSe_3$, $NbSe_3$, $NbSe_4$, $V_6O_{13}$, $WO_3$, $V_2O_5$, $MoO_3$, $ReO_3$, $RuO_2$, $TiS_2C$, $Ti_2S_2C$, $TaS_2C_2$, $TiPS_3$, $NipS_3$, $CrPS_3$, $CrPS_4$, $FeOCl$ and $NiOCl$.

Ionizable lithium salts useable as the solute in the nonaqueous electrolyte typically include $LiAsF_6$, $LiClO_4$, $LiBF_4$, $LiCF_3SO_3$ and $LiPF_6$.

Dipolar aprotic organic solvents for the ionizable lithium salt solute of the nonaqueous electrolyte typically include propylene carbonate, sulfolane, $\gamma$-butyrolactone, dimethyl sulfoxide, dimethyl formamide, methyl formate, dimethyl sulfite, 2-methyl-tetrahydrofuran, 3-methylsulfolane and dioxolane.

Such nonaqueous electrolytes conventionally contain the ionizable lithium salt solute in a concentration of from about 0.5 M to about 2.5 M.

A significant disadvantage of such nonaqueous electrolytes is that the lithium batteries containing such electrolytes have an energy density which fades or decreases appreciably upon repeated discharge-charge (intercalation-deintercalation) cycling.

The object of the present invention is to provide a nonaqueous electrolyte for lithium batteries which will enhance or increase the energy density of the batteries during repeated cycling.

The nonaqueous electrolyte for a lithium battery in accordance with the present invention contains an ionizable lithium salt as the solute and a dipolar aprotic organic solvent therefor, namely, the typical or conventional solutes and solvents in the concentrations mentioned above. Such a nonaqueous electrolyte is improved in accordance with the present invention by incorporating therein 1,4 diazabicyclo [2.2.2.] octane as an energy density enhancing additive in an amount from about 2% by weight to about 8% by weight. The nonaqueous electrolyte preferably contains the additive in an amount from about 2% by weight to about 4% by weight. A particularly preferred amount of additive is about 4% by weight and an especially preferred amount of additive is about 2% by weight.

The 1,4-diazabicyclo [2.2.2] octane additive (common name, "triethylendiamine") has the following structural formula:

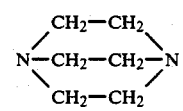

The energy density enhancing property of the additive used in the present invention is illustrated by the comparative data presented in Table I below. In this table, there are set forth the energy density versus cycle number of a typical nonaqueous lithium secondary cell, namely, a cell containing a lithium anode, a $V_6O_{13}$ cathode, and an electrolyte containing $LiAsF_6$ as the ionizable lithium salt solute and sulfolane as the dipolar aprotic organic solvent therefor. The first set of data in Table I is for the electrolyte containing no additive, whereas the remaining four sets of data are for the electrolyte containing 2, 4, 8 and 12 weight % of the additive.

TABLE I

Energy Density vs. Cycle Number
Li ‖ $LiAsF_6$, Sulfolane ‖ $V_6O_{13}$ Cell

| No Additive | | 2 w/o Additive | | 4 w/o Additive | | 8 w/o Additive | | 12 w/o Additive | |
|---|---|---|---|---|---|---|---|---|---|
| Cycle No. | Energy Density (Watt-Hr/Kg) | Cycle No. | Energy Density (Watt-Hr/Kg) | Cycle No. | Energy Density (Watt-Hr/Kg) | Cycle No. | Energy Density (Watt-Hr/Kg) | Cycle No. | Energy Density (Watt-Hr/Kg) |
| 5 | 420 | 5 | 480 | 5 | 450 | 5 | 475 | 5 | 300 |
| 10 | 410 | 10 | 490 | 10 | 480 | 10 | 465 | 10 | 325 |
| 15 | 410 | 15 | 460 | 15 | 450 | 15 | 475 | 15 | 320 |
| 20 | 400 | 20 | 440 | 20 | 440 | 20 | 440 | 20 | 325 |
| 25 | 375 | 25 | 400 | 25 | 430 | 25 | 425 | 25 | 300 |
| 30 | 350 | 30 | 390 | 30 | 410 | 30 | 400 | 30 | 300 |
| 35 | 340 | 35 | 370 | 35 | 380 | 35 | 355 | 35 | 280 |
| 40 | 330 | 40 | 375 | 40 | 385 | 40 | 340 | 40 | 275 |
| 45 | 325 | 45 | 365 | 45 | 350 | 45 | 350 | 45 | 250 |
| 50 | 310 | 50 | | 50 | 330 | 50 | 325 | 50 | 220 |
| 55 | 295 | 55 | | 55 | 335 | 55 | 315 | 55 | 200 |
| 60 | 290 | 60 | | 60 | 330 | 60 | 290 | 60 | 200 |
| 65 | 280 | 65 | | 65 | 350 | 65 | 280 | 65 | 160 |
| 70 | 275 | 70 | | 70 | 320 | 70 | 275 | 70 | |
| 75 | 265 | 75 | | 75 | 320 | 75 | 235 | 75 | |
| 80 | 260 | 80 | | 80 | 290 | 80 | 225 | 80 | |
| 85 | 250 | 85 | | 85 | 260 | 85 | | 85 | |
| 90 | 250 | 90 | | 90 | 250 | 90 | | 90 | |
| 95 | 250 | 95 | | 95 | 250 | 95 | | 95 | |
| 100 | 250 | 100 | | 100 | 250 | 100 | | 100 | |

From a review of the comparative data set forth in Table I above, it will be noted that with the electrolyte containing no additive the cell had an energy density after Cycle No. 5 of only 420 Watt-Hr/Kg. On the other hand, those electrolytes containing 2, 4 and 8 weight percent of the additive imparted to the cell an enhanced or increased energy density after Cycle No. 5 of 480, 450 and 475 Watt-Hr/Kg, respectively. After Cycle No. 45, the electrolyte without an additive imparted to the cell an energy density of only 325 Watt-Hr/Kg, while, on the other hand, after Cycle No. 45 the electrolyte containing 2, 4 and 8 weight percent of the additive imparted to the cell an enhanced or increased energy density of 365, 350 and 350 Watt-Hr/Kg, respectively. Similar enhancement of the energy density of the cell with the electrolyte containing 4 and 8 weight percent of the additive occurred with increasing discharge-charge cycling through Cycle No. 55 and even up to Cycle No. 85 in the case of the electrolyte containing 4 weight percent of the additive.

However, it will be further noted from the comparative data in Table I above that the electrolyte containing 12 weight percent of the additive did not enhance or increase the energy density of the cell during cycling.

It is theorized that the 1,4-diazabicyclo [2.2.2.] octane electrolyte additive of the present invention enhances the energy density of lithium batteries by forming a polymer, namely, poly-1,4-ethylene piperazine, on the surface of the lithium metal anode. The structure of this polymer would be

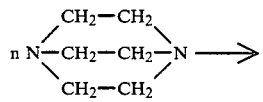

-continued

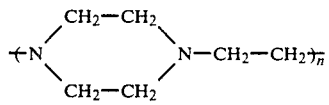

The hetero atom ring in the polymer backbone becomes a cage-like structure which directs a more uniform deposition of the lithium metal upon the anode during charge cycling.

It is further believed that the additive stabilizes the organic solvent of the electrolyte as well as increases ionic mobilities of the solute.

What is claimed is:

1. In a battery comprising an anode having lithium metal as the anode-active material, a cathode having a metal chalcogenide as the cathode-active material, and a nonaqueous electrolyte containing an ionizable lithium salt as the solute and a dipolar aprotic organic solvent therefor, the improvement which comprises said nonaqueous electrolyte further contains 1,4-diazabicyclo [2.2.2] octane as an energy density enhancing additive in an amount from about 2% by weight to about 8% by weight.

2. The battery according to claim 1 wherein the amount of additive is from about 2% by weight to about 4% by weight.

3. The battery according to claim 2 wherein the amount of additive is about 2% by weight.

4. The battery according to claim 2 wherein the amount of additive is 4% by weight.

5. The battery according to claim 1, 2, 3 or 4 wherein the ionizable lithium salt is $LiAsF_6$.

6. The battery according to claim 1, 2, 3 or 4 wherein the dipolar aprotic organic solvent is sulfolane.

7. The battery according to claim 1, 2, 3 or 4 wherein the metal chalcogenide cathode is $V_6O_{13}$.

* * * * *